(12) United States Patent
Waymire et al.

(10) Patent No.: US 10,321,690 B2
(45) Date of Patent: Jun. 18, 2019

(54) PASTRY CRUST CUTTING DEVICES, ASSEMBLIES, COMPONENTS, AND METHODS

(71) Applicants: Katherine Waymire, Minneapolis, MN (US); Melessa E. Paynter, St. Michael, MN (US)

(72) Inventors: Katherine Waymire, Minneapolis, MN (US); Melessa E. Paynter, St. Michael, MN (US)

( * ) Notice: Subject to any disclaimer, the term of this patent is extended or adjusted under 35 U.S.C. 154(b) by 0 days.

(21) Appl. No.: 15/923,999

(22) Filed: Mar. 16, 2018

(65) Prior Publication Data

US 2018/0199580 A1 Jul. 19, 2018

Related U.S. Application Data

(63) Continuation of application No. 15/072,347, filed on Mar. 16, 2016, now abandoned.

(60) Provisional application No. 62/133,985, filed on Mar. 16, 2015.

(51) Int. Cl.
*A21C 11/10* (2006.01)
*A47J 9/00* (2006.01)
*B26B 29/06* (2006.01)

(52) U.S. Cl.
CPC .......... *A21C 11/106* (2013.01); *B26B 29/063* (2013.01); *A47J 9/00* (2013.01)

(58) Field of Classification Search
CPC .............................. A21C 11/12; A21C 11/106

USPC .......................................................... 33/525
See application file for complete search history.

(56) References Cited

U.S. PATENT DOCUMENTS

| | | | | | |
|---|---|---|---|---|---|
| 1,807,146 | A | * | 5/1931 | Broad | A21C 15/00 33/525 |
| 2,434,566 | A | * | 1/1948 | Hulsmann | B26D 3/245 269/288 |
| 2,487,234 | A | * | 11/1949 | Gore | A47G 19/26 269/288 |
| 2,873,780 | A | * | 2/1959 | Schor | B26D 3/245 269/54.4 |
| 3,380,169 | A | * | 4/1968 | Ungar | A47G 19/022 33/525 |
| 4,521,981 | A | * | 6/1985 | Kasprzycki | G09F 3/18 283/56 |
| 2012/0042525 | A1 | * | 2/2012 | Chiu | A21C 11/106 30/310 |

* cited by examiner

*Primary Examiner* — Yaritza Guadalupe
(74) *Attorney, Agent, or Firm* — Fantastic IP Consulting LLC; Eduardo E. Drake

(57) ABSTRACT

To address one or more of these and/or other needs or problems related to forming circular pastry crusts, the present inventor devised, among other things, an exemplary pastry guide including a pivot point and a guide arm having two sets of pastry cutting guides. One set has includes one or more cutting or marking guides configured to guide a knife edge in cutting circular dough shapes of approximately 4-7 inches in diameter and the other set having one or more knife guides configured to guide a knife edge in cutting circular dough shapes of approximately 11-14 in diameter. The exemplary guide is made of a transparent material to further facilitate its use in cutting pastry dough into approximately circular disks.

10 Claims, 3 Drawing Sheets

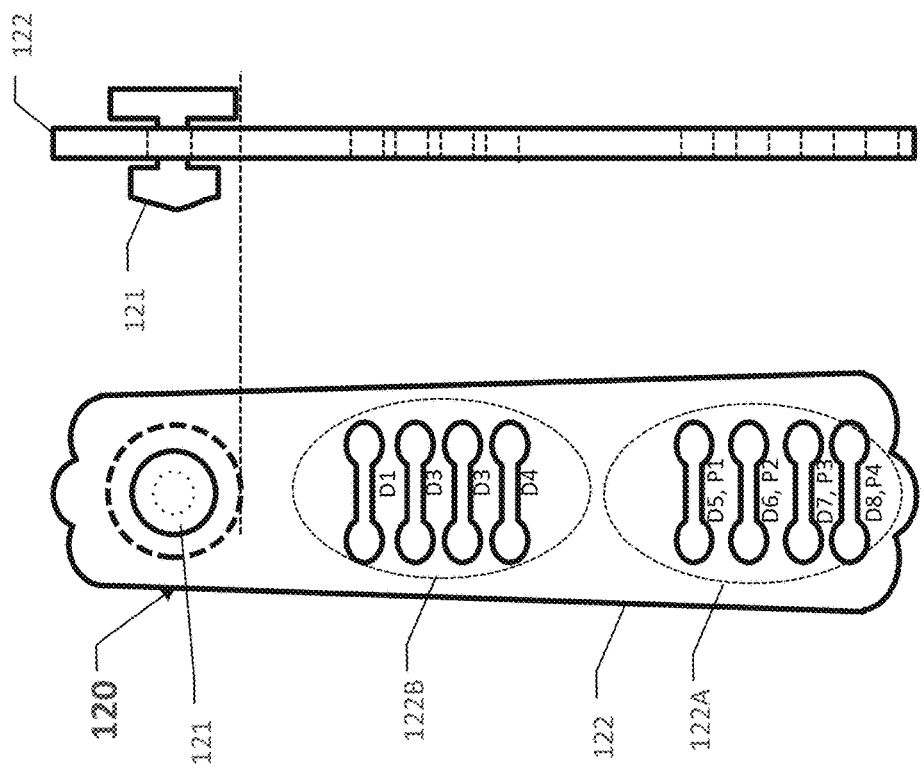

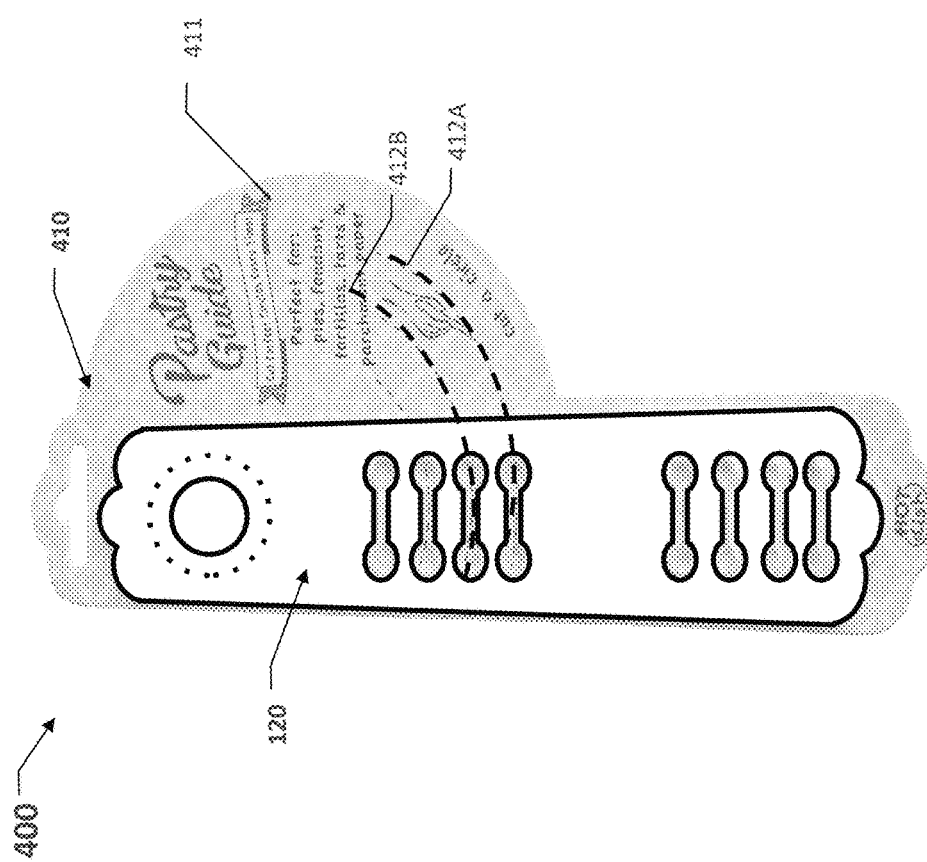

PASTRY CRUST CUTTING DEVICES, ASSEMBLIES, COMPONENTS, AND METHODS

RELATED APPLICATIONS

The present application is a continuation of U.S. patent application Ser. No. 15/072,347, which was filed Mar. 16, 2016 and which claims priority to U.S. Provisional Patent Application 62/133,985, which was filed on Mar. 16, 2015. Both of these applications are incorporated herein by reference in their entirety.

COPYRIGHT NOTICE AND PERMISSION

A portion of this patent document contains material subject to copyright protection. The copyright owner has no objection to the facsimile reproduction by anyone of the patent document or the patent disclosure, as it appears in the patent and trademark office patent files or records, but otherwise reserves all copyrights whatsoever. The following notice applies to this document: Copyright© 2015, TALISMAN DESIGNS, LLC.

TECHNICAL FIELD

Various embodiments of the invention relate generally to pastry-crust cutting devices and related methods.

BACKGROUND

The present inventor has recognized that cutting dough into a circular pattern to make piecrusts is problematic for at least two reasons. First, freehand cutting of dough into a circular pattern is difficult and time consuming. Second is that circular patterns only work for one size, and pie makers typically make pies of various sizes, requiring them not only to buy, but also to store multiple patterns in already crowded cupboards.

Accordingly, the present inventor has identified a need for a better way of cutting piecrusts.

SUMMARY

To address one or more of these and/or other needs or problems, the present inventor devised, among other things, one or more exemplary systems, kits, methods, devices, assemblies, and/or components related to cutting pastry dough with greater ease and efficiency.

In one exemplary embodiment, the invention takes the form of a pastry guide having a pivot point and two sets of pastry cutting guides, one set having one or more knife guides configured to guide a knife edge in cutting circular dough shapes of approximately 4-7 inches in diameter and the other set having one or more knife guides configured to guide a knife edge in cutting circular dough shapes of approximately 11-14 in diameter. In some embodiments, the first set of knife guides provide knife guides, for example slots, for cutting circular shapes of 4", 5", 6", and 7" in diameter and the second set for circular shapes of 11", 12", 13", and 14" in diameter. In some embodiments, the guide is formed of a transparent or semitransparent, translucent, or semitranslucent strip of planar sheet material, which can be die-cut. The pivot point may be snap fit into a pivot hole in one end of the strip with the knife guides or slots positioned on the lot at a distance corresponding to the desired diameter of the pastry shape.

Some embodiments include a snap in plastic pastry blade configured to snap-in to the knife guides, eliminating the need for a separate knife. In some embodiments, the pivot point is formed of silicone, with upper and lower flange portions and a connecting neck in between. The lower flange, which is compressible to fit through a hole in one end of the guide strip, is flat in one embodiment to leave minimum markings on the dough being cut, rounded in another, and pointed in still another embodiment. The upper flange portion is bulbous and large enough to allow for easily placement an support of a fingertip, for example index finger.

In some embodiments, the guide strip is extendable for formation of larger diameter pastry shapes.

BRIEF DESCRIPTION OF THE DRAWINGS

Various embodiments are described herein with reference to the following attached figures. These figures are annotated with reference numbers for various features and components, and these numbers are used in the following description as a teaching aid, with like numbers referring to the same or similar features and components.

FIG. 2 is a top view of an exemplary cutting guide portion of the FIG. 1 assembly, corresponding to one or more embodiments of the present invention.

FIG. 3 is a side view of the exemplary cutting guide portion of the FIG. 1 assembly, corresponding to one or more embodiments of the present invention.

FIG. 4 is a plan view of an exemplary cutting guide package assembly incorporating the exemplary cutting guide portion of the FIG. 1 assembly, and corresponding to one or more embodiments of the present invention.

DESCRIPTION OF EXEMPLARY EMBODIMENT(S)

Figure 1:
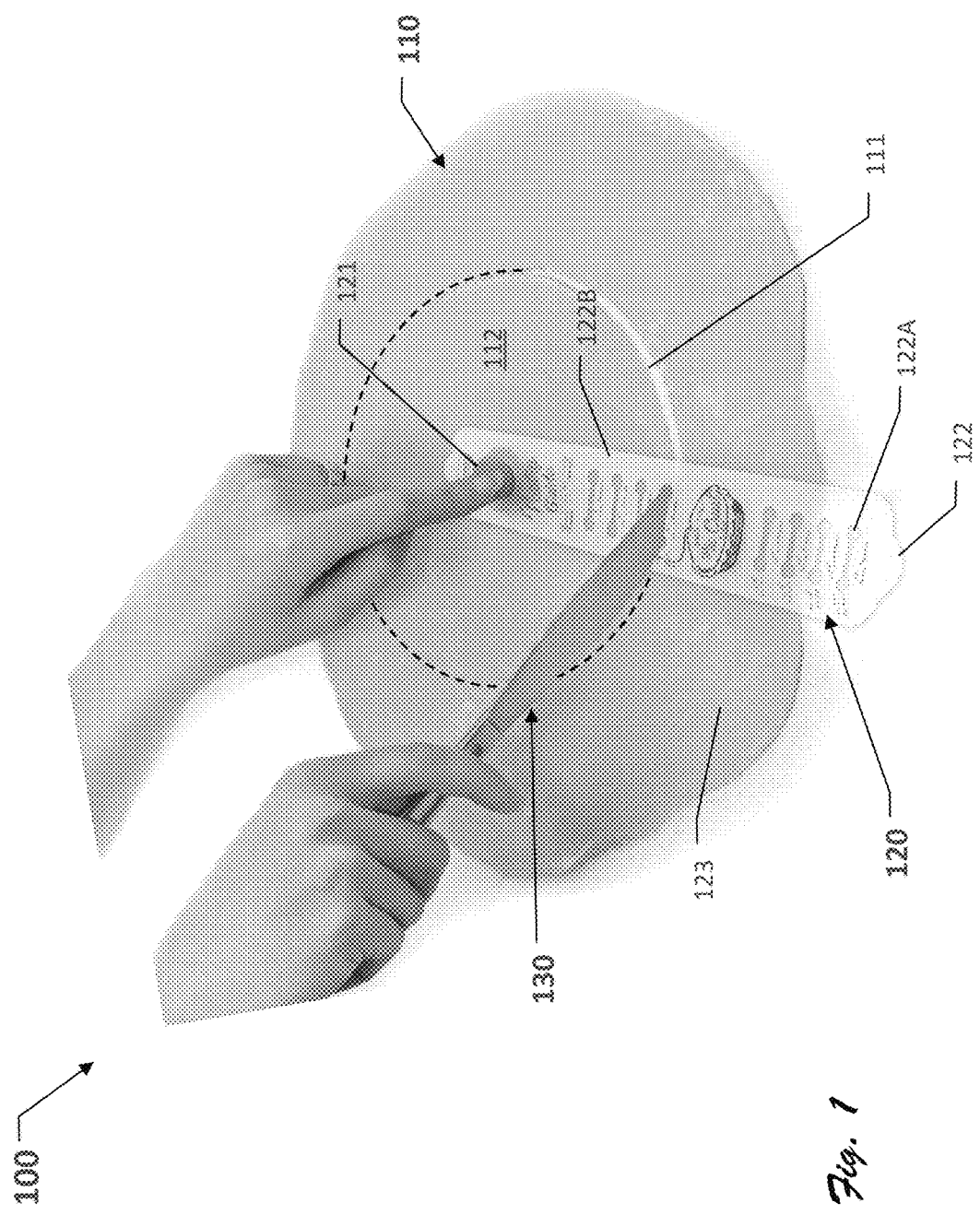
FIG. 1 is a perspective view of an exemplary pastry cutting assembly corresponding to one or more embodiments of the present invention.

This document, which incorporates drawings and claims, describes one or more specific embodiments of one or more inventions. These embodiments, offered not to limit but only to exemplify and teach the invention, are shown and described in sufficient detail to enable those skilled in the art to implement or practice the invention(s). Thus, where appropriate to avoid obscuring the invention(s), the description may omit certain information known to those of skill in the art.

FIG. 1 is a perspective view of an exemplary pastry cutting guide assembly 100. Assembly 100 includes a substantially flat pastry dough 110, a pastry cutting aid 120, and a knife 130. The pastry cutting aid is used to guide a user in manually cutting an approximately or substantially circular disc 112 from the pastry dough by inserting a knife or other object within one of the preset openings 122 of cutting aid 120 and rotating the including a guide arm portion of the cutting guide around a pivot 121 held in place by the user, thereby cutting the dough along cutting path 111. More particularly, cutting guide 120, also shown by itself in FIGS. 2 and 3, includes a pivot 121 and a guide arm 122. Pivot 121, which is shown as having spool form with top and bottom flange portions radiating from opposite ends of an axle portion, extends through an opening in one end of guide arm 122. In the exemplary embodiment, pivot 121 is formed of silicon or rubber or resilient material, enabling one of its flange portions to be compressed and pushed through the opening in guide arm 122 during assembly or to be disassembled if desired by the user for cleaning.

Guide arm 122, which formed for example of a transparent or translucent plastic and takes a generally planar elongated shape, includes guide slots 122. In the exemplary embodiment, the guide slots are arranged into two sets 122A and 122B, with set 122A including four slots and set 122B. Set 122A includes slots which are marked wit indicia to indicate their usage in cutting pastry discs of 4-, 5-, 6-, and 7-inches, and set 122B includes slots which are marked to indicate their usage in cutting pastry disks for use with 8-, 9-, 10-, and 11-inch pastry dishes (corresponding respectively to 11-, 12-, 13-, and 14-inche diameter dishes. In the exemplary embodiment, the slots in set 122B are marked with both diameter markings and dish sizes. Additionally, in the exemplary embodiment, one or more of the guide slots in each of sets 122A and 122B includes a parallel edged portion and two elliptical or circular portions at opposite ends of the parallel portion, with the elliptical or circular portions configured for use with a pen or pencil or other marking device, enabling the guide slots to be specifically to mark paper, fondants, or other desired media with a circular or arcuate form.

Some embodiments are also provided with a cutting insert that plugs selectively into each of the slots. In some embodiments, the insert has a hard plastic or metal cutting blade and hard or soft head portion on an opposite side, configured to plug into the slots. In some embodiments, the cutting blade rotates within head portion.

FIG. 4 shows that an exemplary package assembly 400. Assembly 400 includes cutting guide 120 along with a disposable cardboard placard 410 attached to it via pivot 121. Notably, the placard includes a round portion 411, for example quarter or half round portion. Round portion 411 includes a dough cutting path markings 412A and 412B, which align with corresponding guide slots, providing an effective communication of the function of the pastry guide.

CONCLUSION

In the foregoing specification, specific exemplary embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms, such as second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the term "exemplary" is used as an adjective herein to modify one or more nouns, such as embodiment, system, method, device, and is meant to indicate specifically that the noun is provided as a non-limiting example.

The invention claimed is:

1. A pastry-cutting assembly comprising:
    a pivot point;
    a first set of one or more cutting guides positioned relative to the pivot point to guide a knife edge in cutting circular dough shapes of approximately 4-7 inches in diameter; and
    a second set of one or more cutting guides positioned relative the pivot point to guide a knife edge in cutting circular dough shapes of approximately 11-14 inches in diameter;
    wherein each of the cutting guides is configured to mechanically limit movement of the knife edge to a desired radius from the pivot point, thereby defining a diameter of a circular dough shape cut using the assembly.

2. The pastry-cutting assembly of claim 1, further comprising a marketing placard having at least one arcuate cutting path positioned in alignment with a corresponding one of the cutting guides.

3. The pastry-cutting assembly of claim 1, wherein each cutting guide comprises a slot positioned generally transverse to a radial line passing through the pivot point.

4. The pastry-cutting assembly of claim 1, further comprising a guide arm, wherein each cutting guide comprises an opening in the guide arm.

5. The pastry-cutting assembly of claim 4, wherein the opening is at least partially delineated by first and second opposing curved edges on respective first and second sides of a radial line passing through the pivot point.

6. The pastry-cutting assembly of claim 4, wherein the opening includes first and second generally circular or elliptical edge portions, and the first and second opposing curved edges define respective first and second generally circular or elliptical edge portions of the opening.

7. The pastry-cutting assembly of claim 1, further comprising a transparent strip having a first end portion rotatably attached to the pivot point; and a second portion supporting the first of cutting guides, and a third portion supporting the second set of cutting guides.

8. A pastry-cutting assembly comprising:
    a pivot point;

a first set of one or more cutting guides positioned relative to the pivot point to guide a knife edge in cutting circular dough shapes of approximately 4-7 inches in diameter;

a second set of one or more cutting guides positioned relative the pivot point to guide a knife edge in cutting circular dough shapes of approximately 11-14 inches in diameter; and a transparent strip having a first end portion rotatably attached to the pivot point; and a second portion supporting the first of cutting guides, and a third portion supporting the second set of cutting guides.

9. The pastry-cutting assembly of claim 8, wherein each cutting guide comprises a slot positioned generally transverse to a radial line passing through the pivot point.

10. The pastry-cutting assembly of claim 9, further comprising:

a package comprising a planar sheet of cardboard having a generally semicircular portion with at least one circular arc indicia in alignment with one guide of the first set of cutting guides and further having a bar portion extending from the semicircular portion in general registration with the second set of cutting guides.

\* \* \* \* \*